US006455634B1

(12) United States Patent
Khandpur et al.

(10) Patent No.: US 6,455,634 B1
(45) Date of Patent: Sep. 24, 2002

(54) PRESSURE SENSITIVE ADHESIVE BLENDS COMPRISING (METH)ACRYLATE POLYMERS AND ARTICLES THEREFROM

(75) Inventors: Ashish K. Khandpur, Lake Elmo; Eugene G. Joseph, Vadnais Heights, both of MN (US); Greggory S. Bennett, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/751,141

(22) Filed: Dec. 29, 2000

(51) Int. Cl.$^7$ .......................... C08L 23/00; C08L 23/04; C08G 63/48; C08G 63/91; B32B 15/04
(52) U.S. Cl. ..................... 525/72; 525/73; 525/75; 525/77; 525/78; 525/80; 525/85; 525/191; 525/203; 525/205; 525/212; 525/218; 525/221; 525/222; 525/225; 525/238; 525/240; 525/241; 428/343; 428/355 EN; 428/355 CN; 428/355 AC; 428/375; 442/327; 442/361
(58) Field of Search .................. 525/191, 203, 525/205, 212, 218, 221, 222, 225, 238, 240, 241, 72, 73, 75, 77, 78, 80, 85; 428/343, 355 EN, 355 CN, 355 AC, 375; 442/327, 361

(56) References Cited

U.S. PATENT DOCUMENTS

| | | |
|---|---|---|
| RE24,906 E | 12/1960 | Ulrich |
| 3,492,372 A | 1/1970 | Flanagan |
| 3,635,861 A | 1/1972 | Russell |
| 3,686,107 A | 8/1972 | Russell |
| 3,798,118 A | 3/1974 | Jones |
| 3,806,558 A | 4/1974 | Fischer |
| 3,835,201 A | 9/1974 | Fischer |
| 3,850,858 A | 11/1974 | Park |
| 3,862,068 A | 1/1975 | Russell |
| 3,900,694 A | 8/1975 | Jurrens |
| 3,954,697 A | 5/1976 | McConnell et al. |
| 4,010,221 A | 3/1977 | Gebhart et al. |
| 4,013,169 A | 3/1977 | Cheney |
| 4,072,812 A | 2/1978 | McConnell et al. |
| 4,098,848 A | 7/1978 | Morris |
| 4,130,535 A | 12/1978 | Coran et al. |
| 4,143,858 A | 3/1979 | Schmidt, III et al. |
| 4,152,189 A | 5/1979 | Guerin et al. |
| 4,178,272 A | 12/1979 | Meyer, Jr. et al. |
| 4,217,428 A | 8/1980 | McConnell et al. |
| 4,220,579 A | 9/1980 | Rinehart |
| 4,259,470 A | 3/1981 | Trotter et al. |
| 4,311,628 A | 1/1982 | Abdou-Sabet et al. |
| 4,409,365 A | 10/1983 | Coran et al. |
| 4,554,324 A | 11/1985 | Husman et al. |
| 4,761,450 A | 8/1988 | Lakshmanan et al. |
| 4,789,699 A | 12/1988 | Kieffer et al. |
| 4,857,594 A | 8/1989 | Lakshmanan et al. |
| 4,957,968 A | 9/1990 | Adur et al. |
| 5,057,366 A | 10/1991 | Husman et al. |
| 5,073,457 A | 12/1991 | Blackwell |
| 5,202,361 A | 4/1993 | Zimmerman et al. |
| 5,244,962 A | 9/1993 | Plamthottam et al. |
| 5,330,829 A | 7/1994 | Miller |
| 5,397,843 A | 3/1995 | Lakshmanan et al. |
| 5,462,538 A | 10/1995 | Korpman |
| 5,478,891 A | 12/1995 | Lakshmanan et al. |
| 5,504,136 A | 4/1996 | Davis et al. |
| 5,804,610 A | 9/1998 | Hamer et al. |
| 5,834,562 A | 11/1998 | Silvestri et al. |
| 5,859,114 A | 1/1999 | Davis et al. |
| 6,083,856 A | 7/2000 | Joseph et al. |

FOREIGN PATENT DOCUMENTS

| | | |
|---|---|---|
| EP | 0 178 062 | 4/1986 |
| EP | 0 254 002 | 1/1988 |
| EP | 0 586 937 | 3/1994 |
| EP | 0 604 917 | 7/1994 |
| EP | 0 620 257 | 10/1994 |
| GB | 2 041 949 | 9/1980 |
| JP | 48-27739 | 8/1973 |
| JP | 48-66638 | 9/1973 |
| JP | 55-69637 | 5/1980 |
| JP | 60-120775 | 6/1985 |
| JP | 08 073833 | 3/1996 |
| JP | 11-199723 | 7/1999 |
| WO | WO 96/25469 | 8/1996 |
| WO | WO 96/26967 | 9/1996 |
| WO | WO 97/23577 | 7/1997 |
| WO | WO 98/42780 | 1/1998 |
| WO | WO 98/33858 | 8/1998 |
| WO | WO 98/54268 | 12/1998 |
| WO | WO 99/20664 | 4/1999 |
| WO | WO 99/28539 | 6/1999 |
| WO | WO 99/28540 | 6/1999 |
| WO | WO 00/01745 | 1/2000 |

OTHER PUBLICATIONS

Adhesives Age, TechNotes: Hot Melts, "Extending Styrenic Block Copolymers with Amorphous Polyolefins," by Alicia E. Barrett and Richard A. Miller, (Aug. 1995).

Hawley's Condensed Chemical Dict. (12$^{th}$ Ed.), Revised by Richard J. Lewis, Sr., Van Nostrand Reinhold Company, New York, revised by Richard J. Lewis, Sr., pp. 103, 937, 938, and 1110, (1993).

Journal article Macromolecules, "Miscibility in Blends of Model Polyolefins and Corresopnding Diblock Copolymers: Thermal Analysis Studies," by D.J. Lohse, L.J. Fetters, M.J. Doyle, H.C. Wang and C. Kow, vol. 26, No. 13, pp. 3444–3447, Jun. 21, 1993.

Primary Examiner—Nathan M. Nutter
(74) Attorney, Agent, or Firm—Scott R. Pribnow

(57) ABSTRACT

The present invention relates to a blend of at least one (meth)acrylate polymer and at least one amorphous propylene-derived polymer, and an optional tackifier that provide pressure sensitive adhesive compositions in which improved peel adhesion to at least one of low and relatively high surface energy substrates can be achieved.

24 Claims, No Drawings

US 6,455,634 B1

PRESSURE SENSITIVE ADHESIVE BLENDS COMPRISING (METH)ACRYLATE POLYMERS AND ARTICLES THEREFROM

FIELD OF THE INVENTION

The present invention relates to polymer blends comprising at least one (meth)acrylate polymer and at least one amorphous propylene-derived polymer that exhibit pressure sensitive adhesive properties. The pressure sensitive adhesives are useful in preparing a wide variety of articles.

BACKGROUND OF THE INVENTION

Pressure sensitive adhesive (PSA) compositions are well known to those of ordinary skill in the art to possess properties including the following: (1) aggressive and permanent tack, (2) adherence with no more than finger pressure, (3) sufficient ability to hold onto an adherend, and (4) sufficient cohesive strength. Materials that have been found to function well as PSAs are polymers designed and formulated to exhibit the requisite viscoelastic properties resulting in a desired balance of tack, peel adhesion, and shear holding power. Obtaining the proper balance of properties is not a simple process.

The most commonly used polymers for preparing PSAs are natural rubber-, synthetic rubber- (e.g., styrene/butadiene copolymers (SBR) and styrene/isoprene/styrene (SIS) block copolymers), and various (meth)acrylate- (e.g., acrylate and methacrylate) based polymers. Of these, (meth)acrylate-based polymer PSAs have evolved as a preferred class of PSA due to their optical clarity, permanence of properties over time, and versatility of adhesion levels, to name just a few of the their benefits. It is known to prepare PSAs comprising mixtures of certain (meth)acrylate-based polymers with certain other types of polymers.

European Patent Application No. 0 254 002 (Sumitomo Chemical Co. Ltd.) describes PSAs comprising at least one elastomer (e.g., natural rubber, styrene-butadiene rubber, and acrylic rubber), at least one tackifier, and an ethylene-propylene copolymer having such a low molecular weight that the intrinsic viscosity is not more than 0.5. The ethylene-propylene copolymer is obtainable by oxidative degradation of a corresponding ethylene-propylene copolymer containing 30–60 weight % of propylene. The amount of ethylene-propylene copolymer is in the range of 5–40 parts by weight based on 100 parts by weight of the elastomer. It is taught that the PSA therein is ordinarily dissolved in toluene or the like, coated on a substrate, and then dried to remove the solvent.

U.S. Pat. No. 5,202,361 (Zimmerman et al.) teaches another approach to preparing PSAs using certain (meth) acrylate polymers in combination with certain alpha-olefin polymers. Specifically, the alpha-olefins have a glass transition temperature (Tg) of about −70° C. to about −10° C. and a weight average molecular weight of about 25,000 to about 5,000,000. Furthermore, at least 60 mole % of the olefin monomers used to prepare the alpha-olefin polymers have 6 to 18 carbon atoms. The PSAs purportedly have good adhesion to both low and high energy surfaces. It is taught that the alpha-olefin polymer is dissolved in a mixture of free-radically polymerizable monomers and a photoinitiator/ crosslinker. The liquid composition is then coated on a substrate and cured by irradiating the composition using ultraviolet radiation.

PCT Publication No. WO 97/23,577 (Minnesota Mining and Manufacturing Co.) describes blended PSAs that include at least two components. The first component is a PSA. Among useful PSAs described therein are acrylics and poly alpha-olefins. The second component is a thermoplastic material or elastomer. For example, thermoplastic materials useful in the invention include isotactic polypropylene and ethylene/propylene copolymers. It is also taught that useful thermoplastic materials are essentially immiscible in the PSA component at use temperatures. The Abstract describes the blends therein, which are melt processable, as having a substantially continuous domain (generally the PSA) and a substantially fibrillous to schistose domain (generally the thermoplastic material). Tackifiers may be added.

PCT Publication No. WO 96/25,469 (Minnesota Mining and Manufacturing Co.) describes PSAs that are a blend of about 5 to 95 weight percent of an acrylic PSA and about 5 to about 95 weight percent of a thermoplastic elastomeric copolymer. The thermoplastic elastomeric materials are materials that contain at least two segments, i.e., a hard segment and a soft segment. Useful thermoplastic elastomeric materials include styrene-(ethylene-propylene) block copolymers, polyolefin-based thermoplastic elastomeric materials represented by the formula —($CH_2CHR$)x, where R is an alkyl group containing 2 to 10 carbon atoms, and polyolefins based on metallocene catalysis, such as an ethylene/1-octene copolymer. The blends are melt processable.

Ways to effectively adhere to low surface energy materials is a challenge that those of ordinary skill in the art are attempting to overcome. Many times improvements in adherence to low surface energy substrates compromises adherence to higher surface energy substrates or compromises shear strength of the adhesive. As such, farther adhesives for adequately adhering to low surface energy surfaces, especially those adhesives that perform without comprising adherence to high surface energy substrates, are desired. Similarly, adhesives with improved adherence to high surface energy substrates are beneficial.

It is also desired that any such new adhesives will allow for broad formulation latitude and tailorability for particular applications. For example, in some applications it is desirable to have a hot-melt processable composition, as opposed to those compositions that are coated on a substrate and subsequently dried or cured. It is also preferred to use (meth)acrylate polymers in such adhesives, due to their desirable properties. The present invention addresses these motivating factors.

SUMMARY OF THE INVENTION

PSA blends of the invention are particularly useful for adhering to both relatively high and low surface energy materials. PSA blends of the invention are capable of providing adequate or improved peel adhesion to such substrates. Surprisingly, in preferred embodiments of the invention, peel adhesion to low surface energy substrates, such as polypropylene, is enhanced as compared to peel adhesion of the (meth)acrylate polymer without the propylene-derived polymer to low surface energy substrates or peel adhesion of the propylene-derived polymer without the (meth)acrylate polymer to low surface energy substrates. This enhancement is even possible in some embodiments without causing detrimental effects in peel adhesion to high surface energy substrates. According to other aspects of the invention, peel adhesion to high surface energy substrates, such as glass, is enhanced as compared to peel adhesion of the (meth)acrylate polymer without the propylene-derived polymer to high surface energy substrates or peel adhesion of the propylene-derived polymer without the (meth)acrylate polymer to high surface energy substrates. Useful shear strengths are also realizable using the blends of this invention.

Certain embodiments of the invention provide substrates with the pressure sensitive adhesive composition at least partially applied thereon. Other embodiments of the invention provide fibers and microfiber webs comprising the pressure sensitive adhesive composition.

DETAILED DESCRIPTION OF THE PREFERRED EMBODIMENTS

Pressure sensitive adhesive (PSA) blends of the present invention comprise at least one (meth)acrylate polymer and at least one propylene-derived polymer. Terms used throughout to assist in describing the invention are defined in turn below.

"Polymer" refers to macromolecular materials having at least five repeating monomeric units, which may or may not be the same. The term "polymer", as used herein, encompasses homopolymers and copolymers. Copolymers of the invention refer to those polymers derived from at least two chemically different monomers. Included within the definition of copolymers are traditional copolymers derived from at least five monomers, which include only two chemically different types of monomers, as well as terpolymers, which include at least three chemically different types of monomers, etc.

In general, a polymer can include more than one type of steric structure throughout its chain length. For example, polymers can include crystalline, stereoregular isotactic and syndiotactic structures, as well as amorphous, atactic structures, or combinations thereof The steric structure of a polymer can be determined using any suitable method. For example, carbon-13 Nuclear Magnetic Resonance can be used to determine the steric structure (i.e., tacticity) of a polymer.

"Stereoregular" structures, as defined by *Hawley's Condensed Chemical Dictionary* (12th Edition), are those whose molecular structure has a definite spatial arrangement, rather than the random and varying arrangement that characterizes an amorphous polymer. Stereoregular structures include isotactic and syndiotactic structures.

"Isotactic" structures, as defined by *Hawley's Condensed Chemical Dictionary* (12th Edition), are those whose structure is such that groups of atoms that are not part of the backbone structure are located either all above, or all below, atoms in the backbone chain, when the latter are all in one plane.

"Syndiotactic" structures, as defined by *Hawley's Condensed Chemical Dictionary* (12th Edition), are those whose structure is such that groups of atoms that are not part of the backbone structure are located in some symmetrical and recurring fashion above and below the atoms in the backbone chain, when the latter are all in one plane.

"Atactic" structures, as defined by *Hawley's Condensed Chemical Dictionary* (12th Edition), are those whose structure is such that groups of atoms are arranged randomly above and below the backbone chain of atoms, when the latter are all in one plane.

The "Stereoregular Index (S.I.)" of a polymer is defined as follows: In a perfectly atactic polymer, two homotactic triads, mm and rr, are present in equal amounts (25% each). As the polymer becomes increasingly stereoregular, the relative amounts of mm and rr change so that one increases to be greater than the other. S.I. is the ratio of the larger of mm or rr to the smaller of mm or rr and is always positive and greater than 1. S.I. expresses, in a numerical way, how the steric structure of a polymer shifts away from 1.0 for a random, atactic polymer to larger values characteristic of more stereoregular polymers.

"Non-stereoregular" polymers are generally mostly atactic or mostly semi-syndiotactic polymers, rather than mostly isotactic or mostly syndiotactic.

"Semi-syndiotactic" polymers are those having structures between mostly syndiotactic polymers and mostly atactic polymers.

In one embodiment, non-stereoregular polymers of the invention have an S.I. of 1 to about 10. In another embodiment, non-stereoregular polymers of the invention have an S.I. of 1 to about 7. In still a further embodiment, non-stereoregular polymers of the invention have an S.I. of 1.5 to about 7. In yet another embodiment, non-stereoregular polymers of the invention have an S.I. of 1 to about 1.1.

"Amorphous" polymers are those polymers that are hexane soluble at room temperature. Recognize that such materials may have a small degree of crystallinity, which is detectable, for example, using x-ray or thermal analysis. Amorphous polymers lack a well-defined melting point when measured by Differential Scanning Calorimetry (DSC). Particularly preferred are those amorphous polymers that are non-stereoregular (e.g., mostly atactic or mostly semi-syndiotactic).

"Hot melt processable" refers to those adhesives having a sufficient viscosity upon softening, such that the adhesives can be hot melt processed (e.g., applied to a substrate). It is not necessary for the adhesives to actually melt at the processing temperature, but rather it must soften to the point that it can be made to flow at the processing pressure.

Polymers that have less stereoregularity have been found to be preferred for processing and preparing PSAs of the invention, such as for example, by hot-melt processing. As such, hot-melt processable adhesives are enabled by the present invention.

Hot melt processable adhesives advantageously reduce or eliminate the use of organic solvents in adhesives and their processing. Hot melt processable adhesive systems are essentially 100% solid systems. Usually, such systems have no more than about 5% organic solvents or water, more typically no more than about 3% organic solvents or water. Most typically, such systems are free of organic solvents and water. Advantageously, by reducing the use of organic solvents, special handling concerns associated therewith are also reduced. Furthermore, hot melt processable adhesive systems advantageously do not require a separate processing step after applying the composition to a substrate. Also, in some applications, particularly melt-blown microfiber applications, the adhesive composition must be hot-melt processable.

Another advantage to using polymers that have less stereoregularity is that materials that are highly isotactic tend to be opaque, while those that are less stereoregular tend to be more transparent. The clarity (i.e., transparency) of materials with low stereoregularity makes them preferred for use in applications where clarity of the adhesive is important. Such applications include, for example, bonding of glass and transparent plastics.

One advantage of utilizing blends of the invention is the greater formulation latitude that they provide. That is, changes in a wide variety of physical properties of films comprising the blends can be effectuated, for example, by varying the ratio of individual polymers in the blends. Furthermore, cost effectiveness is another advantage of utilizing blends. For example, less expensive polymers can be blended with more expensive polymers. In that way, the less expensive polymers can act as an "extender" for the more expensive polymers. Also, using blends can provide advantageous synergistic effects, wherein, for a certain application, the blend can perform substantially better than either polymer by itself for the same application.

PSA blends of the invention are particularly useful for adhering to both relatively high and low surface energy materials. PSA blends of the invention are capable of providing adequate or improved peel adhesion to such substrates.

Surprisingly, in preferred embodiments of the invention, peel adhesion to low surface energy substrates, such as polypropylene, is enhanced as compared to peel adhesion of the (meth)acrylate polymer without the propylene-derived polymer to low surface energy substrates or peel adhesion of the propylene-derived polymer without the (meth)acrylate polymer to low surface energy substrates. This enhancement is even possible in some embodiments without causing detrimental effects in peel adhesion to high surface energy substrates.

According to other aspects of the invention, peel adhesion to high surface energy substrates, such as glass, is enhanced as compared to peel adhesion of the (meth)acrylate polymer without the propylene-derived polymer to high surface energy substrates or peel adhesion of the propylene-derived polymer without the (meth)acrylate polymer to high surface energy substrates. Useful shear strengths are also realizable using the blends of this invention.

Preferably at least one of the polymers in the blend is a PSA. However, more than one polymer in the blend may be a PSA. Many polymers are inherently tacky, i.e., the polymers do not require addition of a tackifier to render the composition pressure sensitive. Examples of such inherently tacky polymers include many (meth)acrylate (i.e., methacrylate and acrylate) polymers. However, a polymer may also be made pressure sensitive by addition of a tackifier to the polymer. Whether a polymer is inherently a PSA or requires addition of a tackifier, it is preferred that at least one of the polymers in the blend is a PSA.

(Meth)Acrylate Polymer

Any suitable (meth)acrylate (i.e. acrylate or methacrylate) polymer can be used in blends of the invention. (Meth) acrylate polymers are those derived from at least one (meth) acrylate monomer. (Meth)acrylate polymers may also be derived from, for example, other ethylenically unsaturated monomers and/or acidic monomers and/or the (meth)acrylate polymers may also be grafted with a reinforcing polymeric moiety. Specific examples of preferred (meth)acrylate polymers are described in the Examples section, infra.

Particularly preferred (meth)acrylate monomers include (meth)acrylate esters of non-tertiary alkyl alcohols, the alkyl groups of which comprise from about 1 to about 18 carbon atoms, preferably about 4 to about 12 carbon atoms, and mixtures thereof. Examples of suitable (meth)acrylate monomers useful in the present invention include, but are not limited to, methyl acrylate, ethyl acrylate, methyl methacrylate, ethyl methacrylate, n-butyl acrylate, decyl acrylate, 2-ethylhexyl acrylate, 2-ethylhexyl methacrylate, hexyl acrylate, isoamyl acrylate, isodecyl acrylate, isodecyl methacrylate, isononyl acrylate, isooctyl acrylate, lauryl acrylate, 2-methylbutyl acrylate, 4-methyl-2-pentyl acrylate, ethoxyethoxyethyl acrylate, isobomyl acrylate, isobornyl methacrylate, 4-t-butylcyclohexyl methacrylate, cyclohexyl methacrylate, phenyl acrylate, phenyl methacrylate, 2-naphthyl acrylate, 2-naphthyl methacrylate, and mixtures thereof Particularly preferred are 2-ethylhexyl acrylate, isooctyl acrylate, lauryl acrylate, n-butyl acrylate, ethoxyethoxyethyl acrylate, and mixtures thereof Examples of other ethylenically unsaturated monomers include, but are not limited to, vinyl esters (e.g., vinyl acetate, vinyl pivalate, and vinyl neononanoate); vinyl amides; N-vinyl lactams (e.g., N-vinyl pyrrolidone and N-vinyl caprolactam); (meth)acrylamides (e.g., N,N-dimethyl acrylamide, N,N-dimethyl methacrylamide, N,N-diethyl acrylamide, and N,N-diethyl methacrylamide); (meth)acrylonitrile; maleic anhydride; styrene and substituted styrene derivatives (e.g., alpha-methyl styrene); and mixtures thereof Optional acidic monomers may also be used for preparation of the (meth)acrylate polymers. Useful acidic monomers include but are not limited to, those selected from ethylenically unsaturated carboxylic acids, ethylenically unsaturated sulfonic acids, ethylenically unsaturated phosphonic acids, and mixtures thereof Examples of such compounds include those selected from acrylic acid, methacrylic acid, itaconic acid, fumaric acid, crotonic acid, citraconic acid, maleic acid, beta-carboxyethyl acrylate, 2-sulfoethyl methacrylate, styrene sulfonic acid, 2-acrylamide-2-methylpropane sulfonic acid, vinyl phosphonic acid, and the like, and mixtures thereof A suitable class of useful (meth)acrylate polymers is described in U.S. Pat. No. 4,554,324. This patent discloses reinforcement of conventional (meth)acrylate polymers by modification of the (meth)acrylate polymeric backbone by grafting reinforcing polymeric moieties onto the (meth) acrylate polymeric backbone. The reinforcing polymeric moieties may be grafted, for example, by in-situ polymerization of the reinforcing polymeric moieties in the presence of and onto reactive sites of the ungrafted (meth)acrylate polymer backbone, reacting prepolymerized polymeric moieties with reactive sites of the ungrafted (meth)acrylate polymer backbone, or by copolymerizing reinforcing polymeric compounds with monomer used to prepare the (meth) acrylate polymer backbone to form the (meth)acrylate polymer grafted with reinforcing polymeric moieties.

The reinforcing polymeric moieties in this embodiment generally have a Tg (glass transition temperature) of at least 20° C. and a weight average molecular weight of at least 2,000. By contrast, the ungrafted (meth)acrylate polymer backbone generally has a Tg of less than about −20° C., usually less than about −50° C. in this embodiment. Preferred reinforcing polymeric moieties are those based on polymethylmethacrylate and polystyrene.

The Tg of a reinforcing polymeric moiety or ungrafted (meth)acrylate polymer backbone is measurable using Differential Scanning Calorimetry using second heat measurements at 10° C. per minute.

Depending on the particular application, other suitable monomers, including diene monomers, may be copolymerized with the (meth)acrylate monomers when preparing the (meth)acrylate polymer. However, in one embodiment, the (meth)acrylate polymer of the invention is derived from essentially no diene monomers.

Propylene-Derived Polymer

Any suitable polymer can be used for the propylene-derived polymer. The propylene-derived polymers themselves, may or may not have PSA properties. Generally, the propylene-derived polymer is at least amorphous, preferably non-stereoregular. As such, the compositions of the invention are able to have enhanced pressure-sensitive adhesive properties, often without the need for using substantial amounts of additives, such as plasticizers or liquid oils.

The propylene-derived polymer is derived from at least propylene monomer. While other types of monomers may be used in their preparation, typically the propylene-derived polymer is derived from greater than 60 mole percent propylene monomers. Other monomers that can be copolymerized with the propylene monomer include, for example, alpha-olefin monomers (e.g., ethylene, 1-butene, 1-hexene, 1-heptene, 1-octene, 1-nonene, etc.).

It is preferred that the propylene-derived polymer contains a saturated hydrocarbon backbone. Accordingly, preferably the propylene-derived polymer is derived from essentially no diene monomers. Many compositions derived from diene monomers are relatively unstable over time, such as for example, when exposed to weathering or higher temperatures (e.g., when hot-melt processing).

Propylene-derived polymers of the invention are of high enough molecular weight that they do not act as a tackifier or plasticizer. Typically, the weight average molecular weight of the propylene-derived polymer is at least about 5,000 grams/mole. Preferably, the weight average molecular weight of the propylene-derived polymer is at least about 10,000 grams/mole, even more preferably at least about 15,000 grams/mole, and even more preferably at least about 20,000 grams/mole. Particularly useful are polymers with a weight average molecular weight of about 10,000–1,000,000 grams/mole, preferably about 20,000–200,000 grams/mole.

According to one aspect of the invention, the propylene-derived polymer is a copolymer derived from at least propylene and ethylene monomer. Any suitable amount of ethylene monomer may be used to prepare such propylene/ethylene-derived copolymers as long as the resulting copolymer is amorphous. Generally, however, the greater the proportion of ethylene monomer used, the more likely it is that the resulting copolymer will not be amorphous.

Particularly useful are the propylene/ethylene-derived copolymers with a glass transition temperature (Tg) of about −50° C. to about 0° C., preferably greater than −40° C. to about 0° C., and more preferably about −30° C. to about 0C. Generally, when the Tg of the propylene/ethylene-derived copolymer is lower than −50° C., it is because a larger proportion of ethylene monomer was used in preparation of the copolymer. While some such copolymers may be useful for certain embodiments of the invention, as discussed above, these polymers may not be amorphous. Furthermore, it is preferred that the Tg of the propylene/ethylene-derived copolymer is greater than about −50° C. in order to reduce the necessity for adding a tackifier, or at least a large amount of tackifier, to the composition in order to obtain PSA properties for room temperature applications. The Tg of a polymer is measurable using Differential Scanning Calorimetry using second heat measurements at 10° C. per minute.

Examples of propylene/ethylene-derived copolymers useful in the present invention include polymers commercially available from Eastman Chemical Co.; Kingsport, Tenn. under the EASTOFLEX tradename and polymers commercially available from The International Group; Wayne, PA under the KTAC tradename. Specific examples of suitable propylene/ethylene-derived copolymers from these companies are those with a Tg of about −33° C. to about −23° C., such as EASTOFLEX E1060, EASTOFLEX E1200, and KTAC 6013.

More generally, according to another embodiment of the invention, the propylene-derived polymer is a copolymer derived from at least propylene and one other alpha-olefin monomer, such as 1-hexene. A specific example of a commercially available propylene/hexene-derived copolymer is that sold under the trade designation, EASTOFLEX D127S, available from Eastman Chemical Co.; Kingsport, Tenn.

According to another aspect of the invention, the propylene-derived polymer is derived from essentially 100 percent by weight propylene monomers. Any suitable polypropylene can be used in accordance with this aspect of the invention.

When the propylene-derived polymer is derived from essentially 100 percent by weight propylene, the preferred Tg of these polymers is about −15° C. to about 10° C., more preferably about −10° C. to about 5° C. The use of at least one propylene-derived polymer having such a preferred Tg facilitates formation of a composition having PSA properties. Again, the Tg of a polymer is measurable using Differential Scanning Calorimetry using second heat measurements at 10° C. per minute.

When higher molecular weight propylene-derived polymers, particularly polypropylene, are preferred, those polymers prepared using a metallocene catalyst, such as in PCT Publication No. WO 99/20,664, are particularly useful. Typically, polymers prepared using a metallocene catalyst (i.e., metallocene-generated polymers) have a weight average molecular weight of greater than about 70,000 grams/ mole, which is typically higher than the molecular weight of many commercially available non-stereoregular propylene-derived polymers. A similar comparison applies when comparing melt viscosities of the polymers. Propylene-derived polymers prepared using metallocene catalysts may be preferred when PSA compositions having higher shear strength are desired in addition to improved peel adhesion properties. The higher molecular weight of the propylene-derived polymers prepared using a metallocene catalyst also enables them to be more usefully crosslinked, as compared to those propylene-derived polymers having lower molecular weights. This may be the case, when for example, the PSAs are to be used in a high performance application.

According to one embodiment of this aspect of the invention, the stereoregularity index (S.I.) of the propylene-derived polymer is about 1.0 to about 5.0. Preferably, when the propylene-derived polymer is amorphous, its S.I. is about 1.0 to about 1.05. Preferably, when the propylene-derived polymer is semi-syndiotactic, its stereoregularity index (S.I.) is about 1.1 to about 4.0.

As stated previously, however, one advantage of the present invention is that the blends are tailorable for a wide variety of applications. Higher molecular weight polymers may not always be preferred depending on the application. For example, lower molecular weight polymers may be preferred when using the PSA composition to form a fiber (e.g., melt-blown fiber). PSA blends of the invention may be advantageously used to prepare melt-blown microfiber webs, for example. Addition of a lower molecular weight polymer to a conventional polymer composition in accordance with the invention tends to lower the melt viscosity of the polymer composition at a given processing temperature. Therefore, the use of polymer blends of the invention may facilitate hot melt processing of fibers (e.g., microfibers) from PSA compositions at lower temperatures than those used to hot melt process fibers from conventional PSA compositions. Also, the use of polymer blends of the invention may facilitate a higher throughput of hot melt processed fibers at a given processing temperature.

The melt viscosity of the propylene-derived polymer can vary widely. Typically, however, the melt viscosity of the propylene-derived polymer is at least about 10 Poise when measured at 190° C. according to the Viscosity Test method in the Examples section, infra.

In one embodiment, particularly those embodiments where the propylene-derived polymer is derived from essentially 100 percent by weight propylene, melt viscosity of the propylene-derived polymer is greater than about 500 Poise, more preferably greater than about 750 Poise, when measured at 190° C. according to the Viscosity Test method in the Examples section, infra. In a further embodiment according to this aspect of the invention, the melt viscosity of the propylene-derived polymer is greater than about 2,500 Poise when measured at 190° C. according to the Viscosity Test method. In still a further embodiment of this aspect of the invention, the melt viscosity of the propylene-derived polymer is greater than about 10,000 Poise when measured at 190° C. according to the Viscosity Test method.

Generally, the higher the melt viscosity of the propylene-derived polymer, the more likely it is that the resulting composition will have a higher shear strength in conjunction with improved peel adhesion properties. This is particularly beneficial when preparing PSA compositions of the invention for high performance applications.

Optional Tackifier

Tackifiers of the invention have a weight average molecular weight of less than about 10,000 grams/mole and may be a in a solid or liquid state. The compositions of the invention may include a tackifier, where necessary to impart the desired PSA properties. Those of ordinary skill in the art recognize that a wide variety of tackifier are suitable for this purpose. The amount of tackifier used is readily appreciated by one of ordinary skill in the art.

Preparation of Blends

PSA compositions of the invention include at least one (meth)acrylate polymer and at least one propylene-derived polymer. Other additives (e.g., antioxidants, crosslinking additives, fillers, and ultraviolet stabilizers) may also be added to the PSA compositions, depending on the desired application and as well known to one of ordinary skill in the art.

Each of the (meth)acrylate polymer and propylene-derived polymer components of the blend is preferably present in an amount of about 5 weight % to about 95 weight % based on total weight of the blend. More preferably, each of the components is present in an amount of at least about 10 weight % based on total weight of the blend. Typically, however, the (meth)acrylate polymer component is present in a major portion and the propylene-derived polymer component is present in a minor portion based on total weight of the two components. This ratio of components contributes to obtainment of compositions having adequate adhesion to both relatively high surface energy substrates and low surface energy substrates. It has also been found that this ratio facilitates formation of compositions having useful shear strengths by, for example, facilitating crosslinking of the pressure sensitive adhesive composition.

No matter what proportion of the total blend each of the polymeric components comprises, the propylene-derived polymer component is present in at least about 15 weight % based on total weight of the (meth)acrylate polymer and propylene-derived polymer components. Below this amount, significant improvements in peel adhesion to at least one of high or low surface energy substrates is not as readily obtainable. Preferably, the propylene-derived polymer component is present in at least about 20 weight %, more preferably about 20 weight % to about 50 weight %, based on total weight of the (meth)acrylate polymer and propylene-derived polymer components.

According to a farther embodiment of the invention, the (meth)acrylate polymer component is present in at least about 15 weight % based on total weight of the (meth) acrylate polymer and propylene-derived polymer components. Preferably, the (meth)acrylate polymer component is present in at least about 20 weight %, more preferably about 20 weight % to about 50 weight %, based on total weight of the (meth)acrylate polymer and propylene-derived polymer components.

Blending of the polymers is done by any method that results in a substantially homogeneous distribution of the polymers. The polymers can be blended using several methods. In particular, the polymers can be blended by melt blending, solvent blending, or any suitable physical means.

For example, the polymers can be melt blended by a method as described by Guerin et al. in U.S. Pat. No. 4,152,189. That is, all solvent (if used) is removed from each polymer by heating to a temperature of about 150° C. to about 175° C. at a pressure of about 5 Torr to about 10 Torr. Then, the polymers are weighed into a vessel in the desired proportions. The blend is then formed by heating the contents of the vessel to about 175° C., while stirring.

Although melt blending is preferred, the PSA blends of the present invention can also be processed using solvent blending. In that case, the polymers in the blend should be substantially soluble in the solvents used.

Physical blending devices that provide dispersive mixing, distributive mixing, or a combination of dispersive and distributive mixing are useful in preparing homogenous blends. Both batch and continuous methods of physical blending can be used. Examples of batch methods include those methods using BRABENDER (e.g., a BRABENDER PREP CENTER, available from C. W. Brabender Instruments, Inc.; South Hackensack, N.J.) or BANBURY internal mixing and roll milling (available from FARREL COMPANY; Ansonia, Conn.) equipment. Examples of continuous methods include single screw extruding, twin screw extruding, disk extruding, reciprocating single screw extruding, and pin barrel single screw extruding.

Applications

The PSA compositions of the present invention can be readily applied to a substrate. For example, the PSA composition can be applied to sheeting products (e.g., decorative, reflective, and graphical), labelstock, and tape backings. The substrate can be any suitable type of material depending on the desired application. Typically, the substrate comprises a nonwoven, paper, polymeric film (e.g., polypropylene (e.g., biaxially oriented polypropylene (BOPP)), polyethylene, polyurea, or polyester (e.g., polyethylene terephthalate (PET)), or release liner (e.g., siliconized liner).

PSA compositions according to the present invention can be utilized to form tape, for example. The PSA is applied to at least one side of the backing. The PSA may then be crosslinked to further improve the shear strength of the PSA. Any suitable crosslinking method (e.g., exposure to radiation, such as actinic (e.g., ultraviolet or electron beam) or thermal radiation) or crosslinker additive (e.g., including photoactivated and thermally activated curatives) may be utilized.

When double-sided tapes are formed, the PSA is applied onto at least a portion of both sides of the backing. Alternatively, a release material (e.g., low adhesion backsize) can be applied to the opposite side of the backing, if desired. Advantageously, the PSA and/or release material, for example, can be coextruded with the film backing for ease of processing.

The PSA can be applied to a substrate using methods well known to one of ordinary skill in the art. For example, the PSA can be applied using melt extrusion techniques. The PSA composition can be applied by either continuous or batch processes. An example of a batch process is the placement of a portion of the PSA composition between a substrate to which the PSA is to be adhered and a surface capable of releasing the PSA to form a composite structure. The composite structure can then be compressed at a sufficient temperature and pressure to form a PSA layer of a desired thickness after cooling. Alternatively, the PSA composition can be compressed between two release surfaces and cooled to form, for example, a transfer tape.

Continuous forming methods include drawing the PSA composition out of a heated film die and subsequently contacting the drawn composition to a moving plastic web or other suitable substrate. A related continuous forming method involves extruding the PSA composition and a coextruded release material and/or backing from a film die and cooling the layered product to form an adhesive tape. Other continuous forming methods involve directly contacting the PSA composition to a rapidly moving plastic web or other suitable preformed substrate. Using this method, the PSA composition is applied to the moving preformed web using a die having flexible die lips, such as a conventional film or sheeting die. After forming by any of these continuous methods, the films or layers can be solidified by quenching using both direct methods (e.g., chill rolls or water baths) and indirect methods (e.g., air or gas impingement). Hot melt processed fibers can also be prepared using another continuous forming method. Examples of this process can be found, for example, in PCT Publication No. WO 99/28, 539.

Although coating out of solvent is not preferred, the PSA compositions can be coated using a solvent-based method. For example, the PSA composition can be coated by such methods as knife coating, roll coating, gravure coating, rod coating, curtain coating, and air knife coating. The coated solvent-based PSA composition is then dried to remove the solvent. Preferably, the applied solvent-based PSA composition is subjected to elevated temperatures, such as those supplied by an oven, to expedite drying.

The PSA compositions, coatings, and tapes therefrom are exemplified in the following examples. These examples are merely for illustrative purposes and are not meant to be limiting to the scope of the appended claims. All parts, percentages, ratios, etc. in the examples and the rest of the specification are by weight unless indicated otherwise.

EXAMPLES

The following examples are noted as being comparatives by using either one of the following designations: (1) numerical designation followed by the letter "C" (e.g., 6A–C) or (2) by starting with the letter "C" (e.g., C1A). Furthermore, the following test methods were used to characterize the pressure sensitive adhesive blends produced in the following examples.

Test Methods

180° Peel Adhesion

This peel adhesion test is similar to the test method described in ASTM D 3330-90, substituting a glass or polypropylene substrate for the stainless steel substrate described in the test.

Adhesive-coated strips, which had equilibrated at constant temperature (22° C.) and humidity (50% relative humidity) for at least 24 hours, were adhered to a substrate panel, either solvent-washed glass or polypropylene (PP) (commercially available from Aeromat Plastics; Burnsville, Minn.) using a 2 kilogram roller passed once over the strip. The bonded assembly was allowed to dwell at room temperature for less than one minute. The assembly was then tested for 180° peel adhesion using an IMASS slip/peel tester (Model 3M90, commercially available from Instrumentors Inc., Strongsville, OH) at a rate (i.e., crosshead speed) of 30 centimeters/minute (12 inches/minute).

Shear Strength

This shear strength test is similar to the test method described in ASTM D 3654-88. Adhesive-coated strips, which had equilibrated at constant temperature (22° C.) and humidity (50% relative humidity) for at least 24 hours, were cut into 1.27 centimeter (0.5 inch) strips. Each strip was adhered to a stainless steel panel such that a 1.27 centimeter (0.5 inch) by 2.54 centimeter (1 inch) portion of the strip was in firm contact with the panel and one end of the strip hung free. The panel with the adhesive-coated strip attached was held in a rack such that the panel formed an angle of 178° with the extended free end, which was tensioned by application of a force of one kilogram applied as a hanging weight. The 2° less than 180° was used to negate any peel forces, thus ensuring that only shear forces were measured, in an attempt to more accurately determine the holding power of the tape being tested. The time elapsed for each tape example to separate from the test panel was recorded as the Shear Strength. Unless otherwise noted, all shear failures reported herein were cohesive failures of the adhesive (residue left on the panel), adhesive failure is denoted as A (no residue left on the panel). If the test sample did not fail at 10,000 minutes, the test was stopped and a shear value of 10,000 minutes was recorded.

An alternative method was used in certain examples. In the alternative method, a strip measuring 1.27 centimeters by 1.27 centimeters (0.5 inch×0.5 inch) (or 2.54 centimeters by 2.54 centimeters (1.0 inch×1.0 inch)—if separately noted in the table) was adhered to the stainless steel panel and the test described above was performed. These examples are noted in the tables.

Viscosity Test

Melt viscosity was measured as the complex viscosity using Dynamic Mechanical Analysis (DMA) in a parallel plate rheometer (RDA II, Rheometrics, Inc; Piscataway, N.J.) while the sample was heated from room temperature to 200° C. at a rate of 2° C./minute, a frequency of 1 radian/second, and a maximum strain of 10%. The melt viscosity at 190° C. measured according to this method is referenced throughout this application.

Table of Abbreviations

| Abbreviation/ Trade Designation | Description |
| --- | --- |
| AA | acrylic acid |
| EASTOFLEX D127S | propylene/hexene-derived copolymer, commercially available from Eastman Chemical Company; Kingsport, TN |
| EASTOFLEX E1060 | propylene/ethylene-derived copolymer, commercially available from Eastman Chemical Company; Kingsport, TN |
| ESCORENE 3860 | isotactic polypropylene, commercially available from Exxon Chemical Co.; Houston, TX |
| FINA 3374X | isotactic polypropylene, commercially available from Fina Oil and Chemical Co.; Deer Park, TX |
| IOA | isooctyl acrylate |
| KTAC 6013 | propylene/ethylene-derived copolymer, commercially available from The International Group, Inc.; Wayne, PA |
| mPP1 | atactic polypropylene prepared using metallocene catalysts as described in PCT Publication No. WO 99/20,664, Example 18A, with an approximate $M_w$ of 103,000 grams/mole and an approximate $M_w/M_n$ ratio of 4 |
| mPP2 | atactic polypropylene prepared using metallocene catalysts as described in PCT Publication No. WO 99/20,664, Example 18A, with an approximate $M_w$ of 145,000 grams/mole and an approximate $M_w/M_n$ ratio of 5.4 |
| PET | an aminated-polybutadiene primed polyester film of polyethylene terephthalate having a thickness of 38 μm |
| PSA-1 | IOA/AA-derived copolymer grafted with a polystyrene reinforcing moiety, prepared according to Example 11 of U. S. Pat. No. 5,057,366, except that the weight ratio of the IOA/AA/polystyrene("C-2") monomers used was approximately 92/4/4 and the inherent viscosity of the resulting polymer was 0.65 |
| PSA-2 | IOA/AA-derived copolymer grafted with a polymethylmethacrylate reinforcing moiety, prepared according to Example 70 of U.S. Pat. No. 5,057,366, except that the weight ratio of the IOA/AA/polymethylmethacrylate("C-14") monomers used was approximately 92/4/4 and the inherent viscosity of the resulting polymer was 0.79 |
| PSA-3A | IOA/AA-derived copolymer PSA, prepared using an approximate IOA/AA monomer ratio of 95/5 and prepared by mixing 22.8 grams IOA, 1.2 grams AA, 0.28 gram carbon tetrabromide chain transfer agent, and 36 grams ethyl acetate in a glass vessel; then, 0.072 gram VAZO 64 was added and the vessel was made inert using nitrogen gas; the vessel was sealed; the vessel was tumbled in a 55° C. water bath for 24 hours; the resulting polymer was coated on a siliconized polyester release liner; the coated sample was oven-dried for 15 minutes at 65° C., and the dried polymer was recovered |

-continued

Table of Abbreviations

| Abbreviation/<br>Trade<br>Designation | Description |
|---|---|
| PSA-3B | IOA/AA copolymer PSA, prepared using an approximate IOA/AA monomer ratio of 95/5 and prepared as described in U.S. Pat. No. 5,804,610, Composition D-1 in Table 5, except using isooctylthioglycolate chain transfer agent (0.015 part by weight per 100 parts of the formulation) and an ultraviolet radiation intensity of 3.52 mW/cm$^2$ for 510 seconds. |
| PSA-3C | IOA/AA-derived copolymer PSA, prepared as described in U.S. Pat. No. RE 24,906, Example 5, except using an approximate IOA/AA monomer ratio of 95/5 |
| PSA-4 | IOA/AA copolymer PSA, prepared using an approximate IOA/AA monomer ratio of 90/10 and as described in U.S. Pat. No. 5,804,610, Composition D-1 in Table 5, except using isooctylthioglycolate chain transfer agent (0.015 part by weight per 100 parts by weight of the formulation) and an ultraviolet radiation intensity of 3.52 mW/cm$^2$ for 510 seconds |
| PSA-5 | KRATON-based adhesive as described in Example 20 of U.S. Pat. No. 6,083,856 |
| VAZO 64 | azo-bis(isobutyronitrile) initiator, commercially available from E.I. duPont de Nemours & Co.; Wilmington, DE |

Examples 1A–1M

In a 350-cm$^3$-capacity BRABENDER batch mixer, PSA-1 and EASTOFLEX D127S were blended for 10 minutes in a molten state at 50 revolutions per minute and a temperature of 115° C. to 180° C. according to the mix ratios shown in Table 1. The total charge to the mixer was 250 grams. The parts noted in Table 1 are based on total weight of PSA-1 and EASTOFLEX D127S.

The lower temperatures were used when higher levels of EASTOFLEX D127S were present. The specific temperature is noted in Table 1. The blends were coated at approximately 150° C. onto PET at a thickness of 51 gm using a 1.9 centimeter diameter HAAKE single screw extruder (commercially available from Haake Buchler Instruments Inc.; Saddle Brook, N.J.) having a length-to-diameter ratio of 25 and fitted with a 12.5-adhesive centimeter-wide draw die (shimmed to a 250 lm die opening) to form PSA tapes. The performance of these tapes is shown in Table 2.

TABLE 1

| Example | Parts by Weight PSA-1 | Parts by Weight EASTOFLEX D127S | Mixing Temperature (° C.) |
|---|---|---|---|
| 1A-C | 100 | 1 | 170 |
| 1B-C | 95 | 5 | 170 |
| 1C-C | 90 | 10 | 170 |
| 1D | 85 | 15 | 170 |
| 1E | 75 | 25 | 165 |
| 1F | 70 | 30 | 165 |
| 1G | 65 | 35 | 165 |
| 1H | 60 | 40 | 155 |
| 1I | 50 | 50 | 145 |
| 1J | 40 | 60 | 145 |
| 1K | 25 | 75 | 130 |
| 1L | 10 | 90 | 120 |
| 1M | 0 | 100 | 115 |

TABLE 2

| Example | 180° Peel Adhesion to Glass (N/dm) | 180° Peel Adhesion to PP (N/dm) | Room Temperature Shear Strength (minutes) |
|---|---|---|---|
| 1A-C | 55.6 | 45.3 | 321 |
| 1B-C | 69.4 | 63.7 | 853 |
| 1C-C | 80.1 | 78.8 | 72 |
| 1D | 80.3 | 109.4 | 21 |
| 1E | 79.4 | 139.6 | 26 |
| 1F | 84.5 | 86.0 | * |
| 1G | 54.7 | 90.8 | 39 |
| 1H | 47.7 | 85.8 | 53 |
| 1I | 81.0 | 90.4 | 62 |
| 1J | 64.1 | 74.6 | 91 |
| 1K | 73.3 | 77.5 | 155 |
| 1L | 64.5 | 76.4 | 262 |
| 1M | 47.9 | 78.3 | 149 |

* Not tested

Examples 2A–2F

In a BRABENDER batch mixer, PSA-1 and EASTOFLEX E1060 were blended as described in Example 1 at a temperature of 165–170° C. according to the mix ratios shown in Table 3. The parts are based on total weight of PSA-1 and EASTOFLEX E1060. The blends were coated onto PET to the thickness shown in Table 3 as described in Example 1 to form PSA tapes. The adhesive performance of these tapes is shown in Table 4.

TABLE 3

| Example | Parts by Weight PSA-1 | Parts by Weight EASTOFLEX E1060 | Thickness (μm) |
|---|---|---|---|
| 2A-C | 100 | 0 | 51 |
| 2B-C | 90 | 10 | 51 |
| 2C | 75 | 25 | 51 |
| 2D-C | 100 | 0 | 160 |
| 2E-C | 90 | 10 | 150 |
| 2F | 75 | 25 | 130 |

TABLE 4

| Example | 180° Peel Adhesion to Glass (N/dm) | 180° Peel Adhesion to PP (N/dm) | Room Temperature Shear Strength* (minutes) |
| --- | --- | --- | --- |
| 2A-C | 55.6 | 45.3 | 74 |
| 2B-C | 104.4 | 94.4 | 8 |
| 2C | 81.0 | 104.0 | 4 |
| 2D-C | 84.7 | 75.0 | ** |
| 2E-C | 195.1 | 177.3 | 6 |
| 2F | 153.3 | 132.0 | 4 |

* A 1.27 cm × 1.27 cm (0.5 inch × 0.5 inch) strip was used for this test
** Not tested

Examples 3A–3F

In a BRABENDER batch mixer, PSA-1 and KTAC 6013 were blended as described in Example 1 at a temperature of 165–170° C. according to the mix ratios shown in Table 5. The parts are based on total weight of PSA-1 and KTAC 6013. The blends were coated onto PET to the thickness shown in Table 5 as described in Example 1 to form PSA tapes. The adhesive performance of these tapes is shown in Table 6.

TABLE 5

| Example | Parts by Weight PSA-1 | Parts by Weight KTAC 6013 | Thickness (μm) |
| --- | --- | --- | --- |
| 3A-C | 100 | 0 | 51 |
| 3B-C | 90 | 10 | 51 |
| 3C | 75 | 25 | 51 |
| 3D-C | 100 | 0 | 160 |
| 3E-C | 90 | 10 | 130 |
| 3F | 75 | 25 | 130 |

TABLE 6

| Example | 180° Peel Adhesion to Glass (N/dm) | 180° Peel Adhesion to PP (N/dm) | Room Temperature Shear Strength* (minutes) |
| --- | --- | --- | --- |
| 3A-C | 55.6 | 45.3 | 74 |
| 3B-C | 79.3 | 66.2 | 9 |
| 3C | 95.2 | 89.6 | 4 |
| 3D-C | 84.7 | 107.9 | ** |
| 3E-C | 124.7 | 120.2 | ** |
| 3F | 151.1 | 123.5 | ** |

*A 1.27 cm × 1.27 cm (0.5 inch × 0.5 inch) strip was used for this test
** Not tested

Examples 4A–4E

In a BRABENDER batch mixer, PSA-2 and EASTOFLEX D127S were blended as described in Example 1 at a temperature of 160° C. according to the mix ratios shown in Table 7. The parts are based on total weight of PSA-2 and EASTOFLEX D127S. The blends were coated onto PET to the thickness shown in Table 7 as described in Example 1 to form PSA tapes. The adhesive performance of these tapes is shown in Table 8.

TABLE 7

| Example | Parts by Weight PSA-2 | Parts by Weight EASTOFLEX D127S | Thickness (μm) |
| --- | --- | --- | --- |
| 4A-C | 100 | 0 | 41 |
| 4B-C | 90 | 10 | 43 |
| 4C | 75 | 25 | 46 |
| 4D-C | 100 | 0 | 110 |
| 4E-C | 90 | 10 | 120 |

TABLE 8

| Example | 180° Peel Adhesion to Glass (N/dm) | 180° Peel Adhesion to PP (N/dm) | Room Temperature Shear Strength (minutes) |
| --- | --- | --- | --- |
| 4A-C | 41.8 | 43.1 | 596 |
| 4B-C | 51.0 | 47.3 | 62 |
| 4C | 118.6 | 92.6 | 15 |
| 4D-C | 52.5 | 55.1 | 314 |
| 4E-C | 164.1 | 96.3 | 58 |

Examples 5A–5C

In a BRABENDER batch mixer, 85 parts PSA-2, 15 parts EASTOFLEX E1060, and 0.35 part (per 100 parts PSA-2) 2-tert-butyl anthraquinone photocrosslinker were blended as described in Example 1 at a temperature of 165–170° C. The blend was coated onto PET at a thickness of 61 μm as described in Example 1 to form PSA tapes. The adhesive performance of these tapes, with or without exposure to ultraviolet (UV)-radiation. (using a "H-Bulb" UV source from Fusion UV Curing; Rockville, Md.), is shown in Table 9.

TABLE 9

| Example | UV-radiation (mJ/cm²) | 180° Peel Adhesion to Glass (N/dm) | 180° Peel Adhesion to PP (N/dm) | Room Temperature Shear Strength (minutes) |
| --- | --- | --- | --- | --- |
| 5A | 0 | 77.0 | 89.7 | 23 |
| 5B | 200 | 74.4 | 73.1 | 136 |
| 5C | 400 | 81.0 | 60.2 | 172 |

Examples 6A–6H

In a BRABENDER batch mixer, PSA-3A and EASTOFLEX D127S were blended as described in Example 1 at a temperature of approximately 130° C. according to the mix ratios shown in Table 10. The parts are based on total weight of PSA-3A and EASTOFLEX D127S. Additionally, 0.3 part by weight (per 100 parts of the PSA-3A and EASTOFLEX D127S blend) 2-tert-butyl anthraquinone photocrosslinker was added to the BRABENDER batch mixer and mixed with the blend. The blends were coated onto PET to the thickness shown in Table 10 as described in Example 1 to form PSA tapes except that the die temperature was maintained at 120° C. The adhesive performance of these tapes, with and without UV-radiation (using a "H-Bulb" UV source from Fusion UV Curing; Rockville, Md.), is shown in Table 11.

TABLE 10

| Example | Parts by Weight PSA-3A | Parts by Weight EASTOFLEX D127S | Thickness (μm) |
|---|---|---|---|
| 6A-C | 100 | 0 | 51 |
| 6B-C | 90 | 10 | 46 |
| 6C | 75 | 25 | 48 |
| 6D | 60 | 40 | 56 |
| 6E-C | 100 | 0 | 150 |
| 6F-C | 90 | 10 | 140 |
| 6G | 75 | 25 | 120 |
| 6H | 60 | 40 | 120 |

TABLE 11

| Example | UV-radiation (mJ/cm$^2$) | 180° Peel Adhesion to Glass (N/dm) | 180° Peel Adhesion to PP (N/dm) | Room Temperature Shear Strength (minutes) |
|---|---|---|---|---|
| 6A-C | 0 | 70.9 | 63.2 | 1 |
| 6B-C | 0 | 67.8 | 62.4 | 1 |
| 6C | 0 | 62.6 | 72.2 | 2 |
| 6D | 0 | 56.5 | 72.2 | 3 |
| 6E-C | 0 | 220.1 | 99.6 | 1 |
| 6F-C | 0 | 249.9 | 223.6 | 1 |
| 6G | 0 | 198.7 | 217.7 | 1 |
| 6H | 0 | 155.6 | 195.8 | 2 |
| 6A-C | 500 | 32.6 | 28.4 | 255 |
| 6B-C | 500 | 30.4 | 35.9 | 254 |
| 6C | 500 | 31.3 | 43.1 | 145 |
| 6D | 500 | 37.6 | 69.1 | 34 |
| 6E-C | 500 | 41.1 | 45.9 | 52 |
| 6F-C | 500 | 44.0 | 52.3 | 107 |
| 6G | 500 | 55.8 | 70.7 | 197 |
| 6H | 500 | 63.2 | 123.8 | 27 |

Examples 7A–7F

In a BRABENDER batch mixer, PSA-4 and EASTOFLEX D127S were blended as described in Example 1 at a temperature of 160° C. according to the mix ratios shown in Table 12. The parts are based on total weight of PSA-4 and EASTOFLEX D127S. Additionally, 0.3 part by weight (per 100 parts of the PSA-4 and EASTOFLEX D127S blend) 2-tert-butyl anthraquinone photocrosslinker was added to the BRABENDER batch mixer and mixed with the blend. The blends were coated onto PET to the thickness shown in Table 12 as described in Example 1 to form PSA tapes. The adhesive performance of these tapes, with and without UV-radiation, is shown in Table 13.

TABLE 12

| Example | Parts by Weight PSA-3A | Parts by Weight EASTOFLEX D127S | Thickness (μm) |
|---|---|---|---|
| 7A-C | 100 | 0 | 51 |
| 7B-C | 90 | 10 | 48 |
| 7C | 75 | 25 | 48 |
| 7D-C | 100 | 0 | 120 |
| 7E-C | 90 | 10 | 100 |
| 7F | 75 | 25 | 120 |

TABLE 13

| Example | UV-radiation (mJ/cm$^2$) | 180° Peel Adhesion to Glass (N/dm) | 180° Peel Adhesion to PP (N/dm) | Room Temperature Shear Strength (minutes) |
|---|---|---|---|---|
| 7A-C | 0 | * | * | 108 |
| 7B-C | 0 | * | * | 87 |
| 7C | 0 | * | * | 81 |
| 7D-C | 0 | * | * | 62 |
| 7E-C | 0 | * | * | 57 |
| 7F | 0 | * | * | 44 |
| 7A-C | 500 | 42.2 | 5.3 | 10,000 |
| 7B-C | 500 | 31.1 | 7.2 | 2,530 |
| 7C | 500 | 29.5 | 37.0 | 225 |
| 7D-C | 500 | 56.9 | 7.2 | 417 |
| 7E-C | 500 | 26.7 | 28.2 | 915 |
| 7F | 500 | 64.3 | 108.5 | 158 |

* Not tested

Examples 8A–8L

In a BRABENDER batch mixer, PSA-1 and mPP1 were blended as described in Example 1 at a temperature of 165–170° C. according to the mix ratios shown in Table 14. The parts are based on total weight of PSA-1 and mPP1. Additionally, in Examples 8B and 8C, 0.3 part by weight (per 100 parts of the PSA-1 and mPP1 blend) 2-tert-butyl anthraquinone photocrosslinker was added to the BRABENDER batch mixer and mixed with the blend. The blends were coated onto PET to the thickness shown in Table 14 as described in Example 1 to form PSA tapes. The adhesive performance of these tapes is shown in Table 15.

TABLE 14

| Example | Parts by Weight PSA-3A | Parts by Weight EASTOFLEX D127S | Thickness (μm) |
|---|---|---|---|
| 8A-C | 100 | 0 | 51 |
| 8B-C | 90 | 10 | 51 |
| 8C | 75 | 25 | 51 |
| 8D | 60 | 40 | 51 |
| 8E | 30 | 70 | 51 |
| 8F-C | 0 | 100 | 51 |
| 8G-C | 100 | 0 | 130 |
| 8H-C | 90 | 10 | 130 |
| 8I | 75 | 25 | 130 |
| 8J | 60 | 40 | 130 |
| 8K | 30 | 70 | 130 |
| 8L-C | 0 | 100 | 130 |

TABLE 15

| Example | 180° Peel Adhesion to Glass (N/dm) | 180° Peel Adhesion to PP (N/dm) | Room Temperature Shear Strength (minutes) |
|---|---|---|---|
| 8A-C | 51.0 | 45.5 | 322 |
| 8B-C | 64.3 | 55.8 | 87 |
| 8C | 117.1 | 65.9 | 32 |
| 8D | 106.8 | 63.5 | 16 |
| 8E | 81.4 | 65.2 | 16 |
| 8F-C | 33.9 | 69.1 | 18 |
| 8G-C | 84.7 | 75.0 | 83 |
| 8H-C | 82.1 | 69.8 | 114 |
| 8I | 77.0 | 85.8 | 21 |

TABLE 15-continued

| Example | 180° Peel Adhesion to Glass (N/dm) | 180° Peel Adhesion to PP (N/dm) | Room Temperature Shear Strength (minutes) |
|---|---|---|---|
| 8J | 191.2 | 92.8 | 13 |
| 8K | 115.3 | 92.1 | 14 |
| 8L-C | 39.4 | 96.3 | 14 |

Examples 9A–9B

The samples of examples 8B and 8C were exposed to UV radiation using a "H-bulb" UV source from Fusion UV Curing; Rockville, Md. The blend compositions are shown in Table 16. The adhesive performance of these tapes, with and without exposure to UV-radiation, is shown in Table 17.

TABLE 16

| Example | Parts by Weight PSA-1 | Parts by Weight mPP1 | Thickness ($\mu$m) |
|---|---|---|---|
| 9A-C | 90 | 10 | 51 |
| 9B | 75 | 25 | 51 |

TABLE 17

| Example | UV-radiation (mJ/cm$^2$) | 180° Peel Adhesion to Glass (N/dm) | 180° Peel Adhesion to PP (N/dm) | Room Temperature Shear Strength (minutes) |
|---|---|---|---|---|
| 9A-C | 0 | 64.3 | 55.8 | 87 |
| 9A-C | 200 | 39.8 | 36.5 | 10,000 |
| 9A-C | 400 | 36.1 | 29.8 | 10,000 |
| 9B | 0 | 117.1 | 65.9 | 31 |
| 9B | 200 | 49.4 | 37.9 | 661 |
| 9B | 400 | 43.5 | 32.4 | 10,000 |

Examples 10A–10G

In a BRABENDER batch mixer, PSA-3B and mPP2 were blended as described in Example 1 at a temperature of 140° C. according to the mix ratios shown in Table 18. The parts are based on total weight of PSA-3B and mPP2. The blends were coated onto PET to a thickness of 90 $\mu$m as described in Example 1 to form PSA tapes. The adhesive performance of these tapes is shown in Table 19.

TABLE 18

| Example | Parts by Weight PSA-3B | Parts by Weight mPP2 |
|---|---|---|
| 10A-C | 100 | 0 |
| 10B-C | 90 | 10 |
| 10C | 85 | 15 |
| 10D | 75 | 25 |
| 10E | 60 | 40 |
| 10F | 25 | 75 |
| 10G-C | 0 | 100 |

TABLE 19

| Example | 180° Peel Adhesion to Glass (N/dm) | 180° Peel Adhesion to PP (N/dm) | Room Temperature Shear Strength* (minutes) |
|---|---|---|---|
| 10A-C | 74.2 | 46.6 | 12 |
| 10B-C | 101.2 | 52.3 | 16 |
| 10C | 135.8 | 57.8 | 16 |
| 10D | 172.4 | 62.6 | 19 |
| 10E | 191.0 | 44.2 | 26 |
| 10F | 25.6 | 44.2 | 183 |
| 10G-C | 21.7 | 37.7 | 1,462 |

*A 2.54 cm × 2.54 cm (1.0 inch × 1.0 inch) strip was used for this test

Comparative Examples C1A–C1E

The formulations of Examples 23–26 and Comparative Example C2 are described in PCT Publication No. WO 97/23,577, in which PSA-3C, a conventional (meth)acrylate polymer, was blended with two different commercial isotactic polypropylene compounds. The ratio of components and type of commercial isotactic polypropylene compound is shown in Table 20. The blend was described as being coated onto PET at a thickness of 90 $\mu$m. The described adhesive performance of these tapes is shown in Table 21.

TABLE 20

| Example | Additive | Parts by Weight PSA-3C | Parts by Weight Additive |
|---|---|---|---|
| C1A | None | 100 | 0 |
| C1B | FINA 3374X | 90 | 10 |
| C1C | FINA 3374X | 85 | 15 |
| C1D | ESCORENE 3860 | 90 | 10 |
| C1E | ESCORENE 3860 | 85 | 15 |

TABLE 21

| Example | 180° Peel Adhesion to Glass (N/dm) | 180° Peel Adhesion to PP (N/dm) | Room Temperature Shear Strength* (minutes) |
|---|---|---|---|
| C1A | 52 | 39 | 100 |
| C1B | 64 | 39 | 110 |
| C1C | 56 | 30 | 150 |
| C1D | 69 | 50 | 80 |
| C1E | 62 | 40 | 250 |

*A 2.54 cm × 2.54 cm (1.0 inch × 1.0 inch) strip was used for this test

Examples 11A–11C

Single-layer fibers and melt blown microfiber webs therefrom were prepared using blends of PSA-1 and EASTOFLEX D127S using a melt-blowing process and conditions as described in Example 20 of U.S. Pat. No. 6.083,856, except that the pre-compounded blend was made from compositions shown in Table 22. The resulting melt-blown microfiber webs had a basis weight of 50 g/m$^2$ and were collected on silicone-coated kraft paper release liner (available from Daubert Coated Products; Dixon; IL). Tapes were prepared by laminating the webs on a PET backing by using 2 passes of a 2 kg roller. The blend compositions and adhesive properties of the melt-blown microfiber webs are presented in Table 22.

TABLE 22

| Example | Parts by Weight PSA-1 | Parts by Weight EASTOFLEX D127S | 180° Peel Adhesion to Glass (N/dm) | 180° Peel Adhesion to PP (N/dm) |
|---|---|---|---|---|
| IIA-C | 100 | 0 | 18.4 | 14.0 |
| 11B-C | 90 | 10 | 27.1 | * |
| 11C | 70 | 30 | 36.8 | 34.2 |

* Not tested

Example 12

Triple-layer fibers and melt-blown microfiber webs therefrom were prepared using a melt-blowing process and conditions as described in Example 25 of U.S. Pat. No. 6,083,856, except that the PSA-5 ("KRATON/ESCOREZ/ZONAREZ PSA") melt stream was replaced by that of a pre-compounded blend of 70 parts by weight of PSA-1 and 30 parts by weight of EASTOFLEX D127S, which formed the outermost layers of the exiting stream from the feedblock. Also, the gear pumps were adjusted so that a 50/50 melt volume ratio of the (PSA-1 and EASTOFLEX D127S blend) and (PSA-1 and PSA-5 blend) was delivered to the die. The resulting melt-blown microfiber web had a basis weight of 50 g/m² and was collected on silicone-coated kraft paper release liner (available from Daubert Coated Products; Dixon; Ill.). Tapes were prepared by laminating the web on the PET backing by using 2 passes of a 2 kg roller. The adhesive properties of the melt-blown microfiber web are shown in Table 23.

TABLE 23

| 180° Peel Adhesion to Glass (N/dm) | 180° Peel Adhesion to PP (N/dm) |
|---|---|
| 24.7 | 24.1 |

Various modifications and alterations of the invention will become apparent to those skilled in the art without departing from the spirit and scope of the invention, which is defined by the accompanying claims. It should be noted that steps recited in any method claims below do not necessarily need to performed in the order that they are recited. Those of ordinary skill in the art will recognize variations in performing the steps from the order in which they are recited.

What is claimed is:

1. A pressure sensitive adhesive composition comprising a blend of:
    at least one (meth)acrylate polymer; and
    at least one amorphous propylene-derived polymer derived from at least about 60% by weight propylene monomers, wherein the at least one propylene-derived polymer comprises at least about 15% by weight based on total weight of the at least one (meth)acrylate polymer and the at least one propylene-derived polymer.

2. The pressure sensitive adhesive composition of claim 1, wherein the at least one propylene-derived polymer comprises polypropylene.

3. The pressure sensitive adhesive composition of claim 2, wherein the polypropylene is a metallocene-generated polypropylene.

4. The pressure sensitive adhesive composition of claim 1, wherein the at least one (meth)acrylate polymer is grafted with at least one reinforcing polymeric moiety.

5. The pressure sensitive adhesive composition of claim 4, wherein the at least one reinforcing polymeric moiety is selected from polymethylmethacrylate, polystyrene, and combinations thereof.

6. The pressure sensitive adhesive composition of claim 1, wherein the at least one propylene-derived polymer comprises a copolymer of propylene and at least one other alpha-olefin.

7. The pressure sensitive adhesive composition of claim 1, wherein the at least one propylene-derived polymer is selected from propylene/ethylene-derived copolymers and propylene/hexene-derived copolymers.

8. The pressure sensitive adhesive composition of claim 1, wherein the at least one propylene-derived polymer has a weight average molecular weight of about 10,000 grams/mole to about 1,000,000 grams/mole.

9. The pressure sensitive adhesive composition of claim 1, wherein the at least one propylene-derived polymer has a melt viscosity at 190° C. of greater than about 10 Poise.

10. The pressure sensitive adhesive composition of claim 1, wherein the at least one propylene-derived polymer has a melt viscosity at 190° C. of greater than about 500 Poise.

11. The pressure-sensitive adhesive composition of claim 1, wherein the at least one propylene-derived polymer has a Tg of about −50° C. to about 0° C.

12. The pressure sensitive adhesive composition of claim 1, wherein the at least one propylene-derived polymer has a Tg of about −15° C. to about 10° C.

13. The pressure sensitive adhesive composition of claim 1, wherein the at least one propylene-derived polymer is derived from essentially no diene monomers.

14. The pressure sensitive adhesive composition of claim 1, wherein the at least one propylene-derived polymer comprises at least about 20% by weight based on total weight of the at least one (meth)acrylate polymer and the at least one propylene-derived polymer.

15. The pressure sensitive adhesive composition of claim 1, wherein the at least one propylene-derived polymer comprises about 20% to about 50% by weight based on total weight of the at least one (meth)acrylate polymer and the at least one propylene-derived polymer.

16. The pressure sensitive adhesive composition of claim 1, wherein the at least one (meth)acrylate polymer comprises at least about 15% by weight based on total weight of the at least one (meth)acrylate polymer and the at least one propylene-derived polymer.

17. The pressure sensitive adhesive composition of claim 1, wherein the at least one propylene-derived polymer is non-stereoregular.

18. The pressure sensitive adhesive composition of claim 1, wherein the at least one propylene-derived polymer has a stereoregularity index of about 1 to about 10.

19. The pressure sensitive adhesive composition of claim 1, wherein the composition is crosslinked.

20. A pressure sensitive adhesive composition of claim 1, wherein the pressure sensitive adhesive composition is applied to at least a portion of a substrate.

21. A pressure sensitive adhesive composition of claim 1, wherein the pressure sensitive adhesive composition is in the form of a fiber.

22. A pressure sensitive adhesive composition of claim 1, wherein the pressure sensitive adhesive is in the form of a microfiber web.

23. A tape comprising:
- a backing having a first and second side; and
- a pressure sensitive adhesive composition comprising a blend of:
  - at least one (meth)acrylate polymer; and
  - at least one amorphous propylene-derived polymer derived from at least about 60% by weight propylene monomers, wherein the at least one propylene-derived polymer comprises at least about 15% by weight based on total weight of the at least one (meth)acrylate polymer and the at least one propylene-derived polymer;
- wherein the pressure sensitive adhesive composition is applied on at least a portion of the first side of the backing and, optionally, on at least a portion of the second side of the backing.

24. A process for preparing a pressure sensitive adhesive composition comprising the steps of:
- providing at least one (meth)acrylate polymer,
- providing at least one amorphous propylene-derived polymer derived from at least about 60% by weight propylene monomers, wherein the at least one propylene-derived polymer comprises at least about 15% by weight based on total weight of the at least one (meth)acrylate polymer and the at least one propylene-derived polymer,
- optionally, adding at least one tackifier to the composition, and
- blending the composition comprising the at feast one (meth)acrylate polymer and the least one amorphous propylene-derived polymer to form the pressure sensitive adhesive composition.

* * * * *

UNITED STATES PATENT AND TRADEMARK OFFICE
CERTIFICATE OF CORRECTION

PATENT NO. : 6,455,634 B1
DATED : September 24, 2002
INVENTOR(S) : Khandpur, Ashish Kumar It is certified that error appears in the above-identified patent and that said Letters Patent is hereby corrected as shown below:

Title page,
Item [56], References Cited, OTHER PUBLICATIONS, please delete third reference and insert -- Journal article Macromolecules, "Miscibility in Blends of Model Polyolefins and Corresponding Diblock Copolymers: Thermal Analysis Studies," by D.J. Lohse, L.J. Fetters, M.J. Doyle, H.C. Wang and C. Kow, vol. 26, No. 13, pp. 3444-3447, Jun. 21, 1993. --.

Column 2,
Line, 40, "As such, farther" should be -- As such, further --.

Column 3,
Line 47, "or combinations thereof The steric" should be -- or combinations thereof. The steric --.

Column 6,
Line 10, "monomers and/or the meth)acrylate" should be -- monomers and/or the (meth)acrylate --.
Line 32, "thereof   Particularly preferred" should be -- thereof.  Particularly preferred --.
Line 34, "acrylate, and mixtures thereof" should be -- acrylate, and mixtures thereof. --.
Line 45, "mixtures thereof" should be -- mixtures thereof. --.
Line 52, "and mixtures thereof Examples of such" should be -- and mixtures thereof. Examples of such --.
Line 58, "and mixtures thereof" should be -- and mixtures thereof. --.

Column 10,
Line 7, "a in a solid or liquid state." should be -- in a solid or liquid state. --.

Column 15,
Line 42, "a thickness of 51 gm" should be -- a thickness of 51 µm --.
Line 46, "fitted with a 12.5-adhesive centimeter-wide draw" should be -- fitted with a 12.5-centimeter-wide draw --
Line 47, "(shimmed to a 250 lm die opening)" should be -- (shimmed to a 250 µm die opening --.
Line 55, in Table 1, under heading titled "Parts by Weight EASTOFLEX D127S, 1" should be -- 0 --.

UNITED STATES PATENT AND TRADEMARK OFFICE
CERTIFICATE OF CORRECTION

PATENT NO. : 6,455,634 B1
DATED : September 24, 2002
INVENTOR(S) : Khandpur, Ashish Kumar It is certified that error appears in the above-identified patent and that said Letters Patent is hereby corrected as shown below:

Column 19,
Line 60, "PSA-3A" should be -- PSA-4 --.

Column 20,
Line 40, "PSA-3A" should be -- PSA-1 --.
Line 41, "D127S" should be -- mPP1 --.

Column 22,
Line 57, "U.S. Pat. No. 6.083,856, except" should be -- U.S. Pat. No. 6,083,856, except --.

Column 23,
Line 17, "6.083,856," should be -- 6,083,856, --.
Line 47, "to performed in the order" should be -- to be performed in the order --.

Column 26,
Line 15, "feast" should be -- least --.

Signed and Sealed this

Twenty-seventh Day of May, 2003

JAMES E. ROGAN
*Director of the United States Patent and Trademark Office*